United States Patent
Ishikawa et al.

(10) Patent No.: US 11,938,884 B2
(45) Date of Patent: Mar. 26, 2024

(54) AIRBAG COVER, METHOD FOR MANUFACTURING SAME, AND AIRBAG DEVICE

(71) Applicants: Asahi Kasei Advance Corporation, Tokyo (JP); Autoliv Development AB, Vargarda (SE); Asahi Kasei Advance (Thailand) Co., Ltd., Samutprakarn (TH)

(72) Inventors: Akira Ishikawa, Tokyo (JP); Atsushi Kobayashi, Tokyo (JP); Yuto Kobayashi, Yokohama (JP)

(73) Assignees: Asahi Kasei Advance Corporation, Tokyo (JP); Autoliv Development AB, Vargarda (SE); Asahi Kasei Advance (Thailand) Co., Ltd., Samutprakarn (TH)

( * ) Notice: Subject to any disclaimer, the term of this patent is extended or adjusted under 35 U.S.C. 154(b) by 0 days.

(21) Appl. No.: 18/008,988

(22) PCT Filed: Jun. 4, 2021

(86) PCT No.: PCT/JP2021/021427
§ 371 (c)(1),
(2) Date: Dec. 8, 2022

(87) PCT Pub. No.: WO2021/251303
PCT Pub. Date: Dec. 16, 2021

(65) Prior Publication Data
US 2023/0278516 A1    Sep. 7, 2023

(30) Foreign Application Priority Data
Jun. 11, 2020 (JP) .................................. 2020-101844

(51) Int. Cl.
*B60R 21/215* (2011.01)
*B60R 21/201* (2011.01)
*B60R 21/207* (2006.01)

(52) U.S. Cl.
CPC .......... *B60R 21/215* (2013.01); *B60R 21/201* (2013.01); *B60R 21/207* (2013.01)

(58) Field of Classification Search
CPC .... B60R 21/215; B60R 21/201; B60R 21/207
See application file for complete search history.

(56) References Cited

U.S. PATENT DOCUMENTS 11,046,277 B2 * 6/2021 Svensson .............. B60R 21/215
11,505,156 B2 * 11/2022 Kabeya ................. B60R 21/201
(Continued)

FOREIGN PATENT DOCUMENTS

DE    102008042657 A1 *  4/2010  .......... B60R 21/215
JP    2015-074295 A       4/2015
(Continued)

OTHER PUBLICATIONS

Supplementary European Search Report issued in corresponding European Patent Application No. 21822922.7 dated Nov. 9, 2023.
(Continued)

*Primary Examiner* — Faye M Fleming
(74) *Attorney, Agent, or Firm* — Morgan, Lewis & Bockius LLP

(57) ABSTRACT

The present invention provides: an airbag cover which is formed by integrally joining a first base fabric and a second base fabric having mutually different characteristics, and has a joint portion that ensures high productivity in mass production; a method for manufacturing the airbag cover; and an airbag device. The present invention relates to an airbag cover for storing a bag-shaped cushion which is rolled up or folded before being inflated and deployed by a gas supplied (Continued)

from an inflater, and relates to a method for manufacturing the airbag cover. The airbag cover is characterized by comprising a first base fabric made of a plain-woven fabric or a non-woven fabric made from chemical fibers, and a second base fabric containing fibers different from the fibers constituting the first base fabric, and having an initial tensile resistance value higher than an initial tensile resistance value of the first base fabric.

16 Claims, 13 Drawing Sheets

(56) References Cited

U.S. PATENT DOCUMENTS

2012/0175924 A1 7/2012 Festag et al.
2021/0300284 A1 9/2021 Kabeya et al.

FOREIGN PATENT DOCUMENTS

| JP | 2019-523172 A | 8/2019 |
| WO | 2018/033343 A1 | 2/2018 |
| WO | 2020/026695 A1 | 2/2020 |

OTHER PUBLICATIONS

International Search Report issued in corresponding International Patent Application No. PCT/JP2021/021427 dated Jul. 20, 2021.
International Preliminary Report on Patentability and Written Opinion issued in corresponding International Patent Application No. PCT/JP2021/021427 dated Dec. 22, 2022.

* cited by examiner (a)

(b)

A VIEW (a)

B-B (b)

(a)

(b)

(a)

(b)

(a)

(b)

(a)

J–J (b)

(a)

(b)

(C)

AIRBAG COVER, METHOD FOR MANUFACTURING SAME, AND AIRBAG DEVICE

FIELD

The present invention relates to an airbag cover for enclosing a cushion which is accommodated in a vehicle interior and which is inflated and deployed for the purpose of protecting occupants in an emergency, as well as a method for the production thereof and an airbag device comprising the airbag cover.

BACKGROUND

Airbag devices are safety devices which operate in an emergency such as a vehicle collision, and include, for example, a bag-shaped cushion. The cushion catches and protects the occupant by inflating and deploying with gas in an emergency. There are various types of airbag devices depending on the installation location and application. As an example, to protect occupants from side collisions and subsequent rollovers, side airbags which inflate and deploy from the side of the vehicle seat to the immediate side of the occupant, and curtain airbags which inflate and deploy from the vicinity of the ceiling of the side wall of the vehicle body along the side window are known.

A cushion is rolled or folded and accommodated in a predetermined location in the vehicle compartment, and inflated and deployed using gas supplied from an incorporated inflator in an emergency. Patent Literature 1 below describes an airbag cover which encloses a folded cushion. However, since the airbag cover described in Patent Literature 1 is merely one which encloses the folded cushion and breaks due to inflation and deployment of the cushion, there is room for improvement in terms of accommodating the folded cushion in a shape which fits in a predetermined location and protecting the cushion from obstacles. Specifically, when a rolled or folded cushion is accommodated in a predetermined location inside a vehicle, it is preferable to accommodate the cushion in a shape which fits in the predetermined location to stabilize the deployment behavior thereof, or to protect the cushion from obstacles to prevent problems such as bursting. The obstacles are assumed to be the edges of the seat frame for side airbag devices, and the roof side rails for curtain airbag devices.

In order to solve this problem, Patent Literature 2 below proposes an airbag cover which is capable of accommodating a rolled or folded cushion in a shape that fits in a predetermined location in a vehicle interior and which protects the cushion from obstacles, as well as a manufacturing method thereof, and an airbag device. A typical configuration of such an airbag cover is an airbag cover which encloses a bag-shaped cushion that is rolled or folded and accommodated in a vehicle interior and that is inflated and deployed using gas supplied from an incorporated inflator, wherein the airbag cover comprises a first base cloth, which is composed of a plain weave base cloth or non-woven fabric made of chemical fibers, and a second base cloth, which is integrally bonded to the first base cloth, comprises fibers different from those of the first base cloth, and has a higher initial tensile resistance value than the first base cloth. The initial tensile resistance value as used herein is defined as the tensile strength when a cloth having a predetermined shape is stretched by 5% under predetermined conditions of pulling the cloth using a predetermined tensile tester. According to such a configuration, since the first base cloth and the second base cloth having different initial tensile resistance values are integrally bonded to form the airbag cover, and the first base cloth and the second base cloth can maintain their own shapes, by enclosing the rolled or folded cushion, the cushion can be accommodated in a shape which fits in a predetermined location in the vehicle. Since the first base cloth has a lower initial tensile resistance value than the second base cloth and is softer, it can be easily deformed to follow the shape of the predetermined location where the cushion is to be accommodated, and the first base cloth can easily maintain the cushion in the desired accommodation state, and by providing slits or the like in the soft first base cloth, it is possible for it to reliably be broken by the cushion without impeding inflation and deployment of the cushion, whereby the deployment behavior of the cushion can be stabilized. Conversely, the second base cloth, which has a relatively high initial tensile resistance value, is arranged on the side of the cushion, for example, near an obstacle such as the edge of the seat frame, and thus can protect the cushion from obstacles not only when the cushion is accommodated, but also during inflation and deployment, and prevent problems such as bursting.

However, Patent Literature 2 merely describes, as a means for integrally bonding the first base cloth and the second base cloth, that the first base cloth and the second base cloth are overlapped, or the first base cloth is interposed between two second base cloths, and heated at a temperature higher than the melting temperature of the fibers constituting one base cloth and pressed, whereby the fluid polymer of one base cloth permeates the interior of the other base cloth such that the cloths are bonded by heat-welding. The second base cloth and the first base cloth before compression molding are bonded by heat-welding. In such a bonding means, for example, when the first base cloth is interposed between two second base cloths before compression and heat-welding is performed for integral bonding by heat-compression, it takes time and effort to insert the first base cloth between the two second base cloths with a predetermined positional relationship, which causes a problem of reduced productivity in mass production.

CITATION LIST

Patent Literature

[PTL 1] Japanese Unexamined Patent Publication (Kokai) No. 2015-74295
[PTL 2] WO 2020/02665

SUMMARY

Technical Problem

In light of the state of the prior art, an object to be achieved by the present invention is to provide an airbag cover which is configured by integrally bonding a first base cloth and a second base cloth having different characteristics, wherein the airbag cover has a bonding portion and is highly productive in mass production, as well as a method for the production thereof and an airbag device.

Solution to Problem

As a result of rigorous investigation and repeated experimentation in order to achieve such an object, the present inventors have unexpectedly discovered that this object can be achieved by preparing a second base cloth as a compression molded body in advance, overlapping a first base cloth thereon, overlapping a substantially strip-shaped member of the same material as the second base cloth thereon, and heat-compressing these, whereby the second base cloth and the first base cloth are integrally bonded by heat-welding, and have completed the present invention.

Specifically, the present invention is as described below.

[1] An airbag cover for accommodating a rolled or folded bag-like cushion prior to inflation and deployment by a gas supplied from an inflator, wherein the airbag cover is constituted by a first base cloth composed of a plain fabric or non-woven fabric constituted from chemical fibers, and a second base cloth comprising fibers different from fibers constituting the first base cloth and having an initial tensile resistance value higher than an initial tensile resistance value of the first base cloth, and has a bonding portion where the first base cloth is interposed between the second base cloth and a substantially strip-shaped member and integrally bonded by thermocompression.

[2] The airbag cover according to [1], wherein the first base cloth has a plurality of slit regions, and at the bonding portion, the second base cloth and the substantially strip-shaped member are directly bonded by thermocompression at the slit regions.

[3] The airbag cover according to [1] or [2], wherein between the second base cloth and the first base cloth, between the first base cloth and the substantially strip-shaped member, and/or between the second base cloth and the substantially strip-shaped member, a polymer of the fibers constituting one thereof permeates between the fibers constituting the other by heat-melting for bonding.

[4] The airbag cover according to any one of [1] to [3], wherein the chemical fibers constituting the first base cloth are at least one selected from the group consisting of rayon, nylon, polyester, polypropylene, acrylic, vinylon, and aramid.

[5] The airbag cover according to any one of [1] to [4], wherein the second base cloth is constituted by a compressed body formed of a compressed ductile fabric material.

[6] The airbag cover according to [5], wherein the ductile fabric material is a felt-like material.

[7] The airbag cover according to [5] or [6], wherein the ductile fabric material is a non-woven fabric material comprising a plurality of types of polymer fibers.

[8] The airbag cover according to any one of [5] to [7], wherein the ductile fabric material comprises polyester fibers.

[9] The airbag cover according to any one of [1] to [8], wherein the second base cloth comprises fibers having a melting point lower than the melting point of the fibers contained in the first base cloth by 30° C. or more.

[10] The airbag cover according to any one of [1] to [9], wherein the substantially strip-shaped member is formed from a ductile fabric material.

[11] An airbag device comprising a cushion enclosed with the airbag cover according to any one of [1] to [10].

[12] The airbag device according to [11], wherein the airbag device is a side airbag device provided on the side of a vehicle seat and the cushion is inflated and deployed on a side of an occupant of the vehicle seat.

[13] The airbag device according to [12], wherein the second base cloth of the airbag cover is provided so as to come into contact with a seat frame incorporated in the vehicle seat along a side of the vehicle seat, and is formed to function as a reaction force surface for receiving a reaction force from the seat frame during inflation and deployment of the cushion.

[14] The airbag device according to [11], which is a curtain airbag device in which the cushion is inflated and deployed along a side wall of a vehicle inside the vehicle.

[15] The airbag device according to [14], wherein the second base cloth of the airbag cover is provided so as to come into contact with the side wall of a vehicle body, and is formed to function as a reaction force surface for receiving a reaction force from the side wall of the vehicle body during inflation and deployment of the cushion.

[16] A method for the production of the airbag device according to any one of [1] to [10], comprising the following steps of heat-compressing a ductile fabric material containing fibers different from fibers constituting a first base cloth composed of a plain fabric or non-woven fabric constituted by chemical fibers, and forming a second base cloth having an initial tensile resistance value higher than an initial tensile resistance value of the first base cloth as a compressed body; and heat-compressing the first base cloth interposed between a part of the obtained second base cloth and a substantially strip-shaped member, and integrally-bonding the second base cloth and the first base cloth by heat-welding.

Advantageous Effects of Invention

The bonding portion between the second base cloth and the first base cloth of the airbag cover according to the present invention has sufficient strength for accommodating a rolled or folded bag-like cushion prior to inflation and deployment by gas supplied from the inflator, and does not prevent the first base cloth from breaking at a predetermined position during inflation and deployment of the cushion. Furthermore, the combination of the step of integrally bonding the second base cloth and the first base cloth in the production method of the airbag cover according to the present invention with the step of forming the second base cloth as a compressed body in advance contributes to a production method having high productivity in mass production.

DESCRIPTION OF EMBODIMENTS

The embodiments of the present invention will be described below with reference to the attached drawings. The dimensions, materials, and other specific numerical values illustrated in these embodiments are merely examples for facilitating understanding of the invention, and do not limit the invention unless otherwise specified. In the present specification and drawings, elements having substantially the same function and configuration are assigned the same reference sign and redundant descriptions thereof are omitted, and elements which are not directly related to the present invention have been omitted from the drawings.

In the present embodiment, when an occupant is seated on a seat in a standard posture, the direction in which the occupant is facing is referred to as the front, and the opposite direction is referred to as the rear. When the occupant is seated on the seat in a standard posture, the right side of the occupant is referred to as the right direction, and the left side of the occupant is referred to as the left direction. When the occupant is seated in a standard posture, the direction toward the head of the occupant is referred to as the upward direction, and the direction toward the waist of the occupant is referred to as the downward direction. In the attached drawings, the front, rear, left, right, upward, and downward directions relative to the occupant are denoted as Fr, Rr, L, R, Up, and Down, respectively, as needed.

Figure 11:
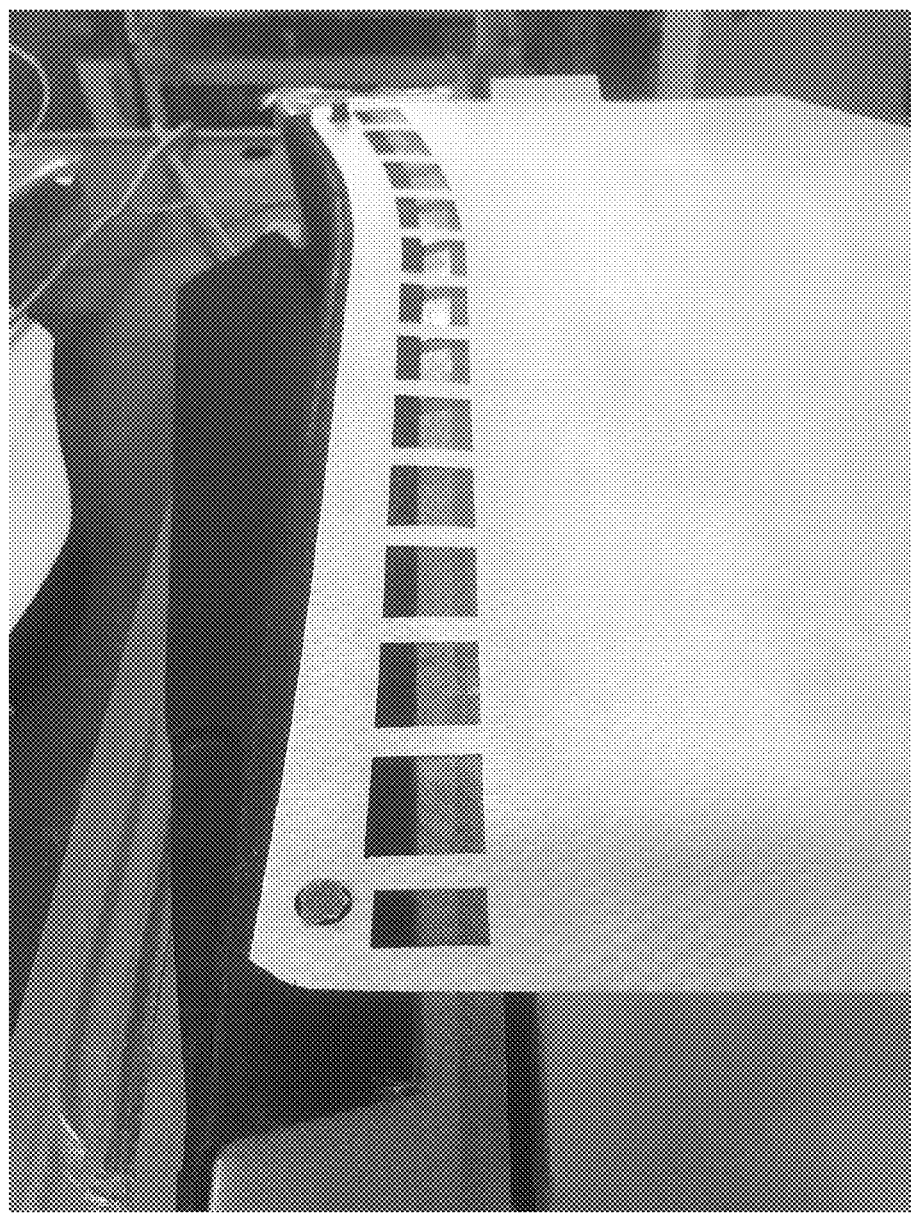
FIG. 11 is a photograph, in place of a drawing, showing a state in which a first base material having a plurality of slit regions is set at a predetermined position on a second base cloth formed by compression.
Figure 12:
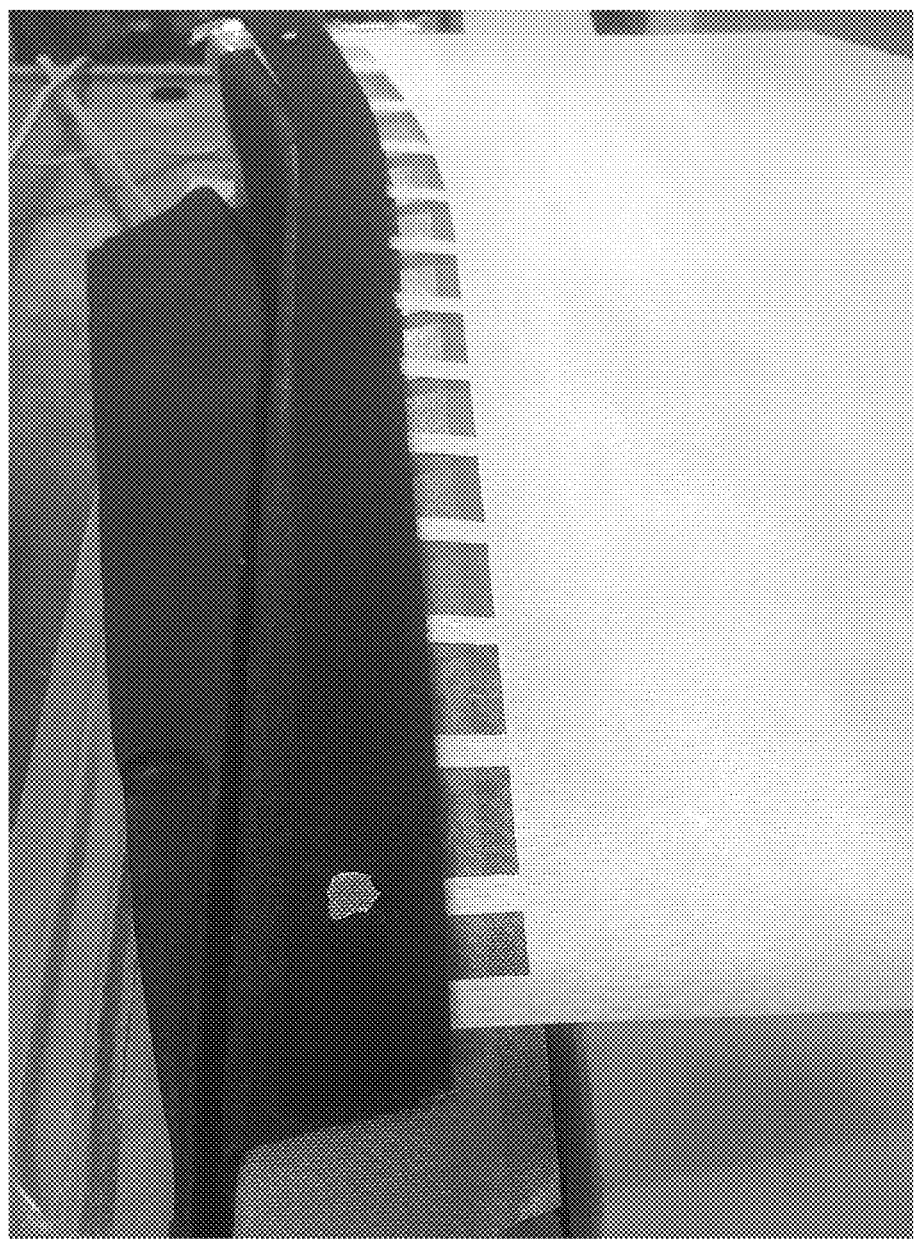
FIG. 12 is a photograph, in place of a drawing, showing a state in which a substantially strip-shaped member is set at a predetermined position on the set first base cloth.

An embodiment of the present invention provides an airbag cover for accommodating a rolled or folded bag-like cushion prior to inflation and deployment by a gas supplied from an inflator, wherein the airbag cover is constituted by a first base cloth composed of a plain fabric or non-woven fabric constituted from chemical fibers, and a second base cloth comprising fibers different from fibers constituting the first base cloth and having an initial tensile resistance value higher than an initial tensile resistance value of the first base cloth, and has a bonding portion where the first base cloth is interposed between the second base cloth and a substantially strip-shaped member and integrally bonded by thermocompression. As illustrated in FIGS. 4(a), 9(b), and 11, in the airbag cover of the present embodiment, it is preferable that the first base cloth have a plurality of slit regions, and at the bonding portion, the second base cloth and the substantially strip-shaped member be directly bonded by thermocompression at the slit regions. By integrally bonding the second base cloth and the substantially strip-shaped member of substantially the same material by thermocompression, the bond therebetween at the bonding portion becomes stronger. It is preferable that between the second base cloth and the first base cloth, between the first base cloth and the substantially strip-shaped member, and/or between the second base cloth and the substantially strip-shaped member, a polymer of the fibers constituting one thereof permeate by heat-melting between the fibers constituting the other for bonding.

The chemical fibers constituting the first base cloth can be at least one selected from the group consisting of rayon, nylon, polyester, polypropylene, acrylic, vinylon, and aramid, and for example, a plain fabric in which the warp and weft of nylon fibers or polyester fibers are woven together, or a non-woven fabric composed of nylon fibers, polyester fibers, or polypropylene fibers can be adopted. The first base cloth is preferably a non-woven fabric of polyester fibers, and can be, for example, a PET spunbond non-woven fabric. Note that the first base cloth may contain glass fibers and carbon fibers in addition to chemical fibers.

The second base cloth can be composed of a compressed body formed of a compressed ductile fabric material. By adopting a compressed body of a ductile fabric material as the second base cloth, the initial tensile resistance value can be made higher than that of the first base cloth. The ductile fabric material can be a non-woven fabric material containing a single type of polymeric fiber or a non-woven fabric material containing a plurality of types of polymeric fibers. The plurality of types of polymeric fibers may include core-sheath (coating) bicomponent composite fibers, and the coatings of the bicomponent composite fibers may be fused together to provide suitable shape stability after compression molding. Furthermore, the core-coating bicomponent composite fibers may be composed of an inner core of a polymeric material having a predetermined melting point and an outer sheath (coating) of a polymeric material having a melting point lower than the predetermined melting point. Furthermore, the plurality of types of polymer fibers may include a plurality of types of single-component fibers. Furthermore, the single component fibers may have a higher melting point than the melting point of the coating component of the core-coating bicomponent composite fibers. Such a non-woven fabric material can be compression molded as the ductile fabric material to form the second base cloth.

The ductile fabric material is preferably a felt-like material. The second base cloth can be formed as a compressed body by using a felt-like material as the ductile fabric material. The second base cloth produced by compression molding using a felt-like material instead of plastic is softer than plastic whereby it can be deformed in accordance with the shape of the predetermined location where the cushion is to be accommodated, and further weight reduction can be achieved. The felt-like material after molding is a compressed body, which is a member derived from felt that has been fused and solidified by pressing, and thus, as the characteristics of the second base cloth, which is the ultimate product using the felt material after molding, i.e., the compressed body, it is softer and more flexible than solid plastic, and higher in rigidity than the raw felt material. A single felt material cloth can be used for the second base cloth, but a plurality of felt materials may be stacked and used in the second base cloth.

The ductile fabric material can comprise polyester fibers.

The second base cloth includes fibers different from the fibers constituting the first base cloth. The term "different"

as used herein includes differences in polymer species, differences in polymer properties, and differences in fiber shape (for example, short fibers and long fibers). The second base cloth may contain fibers of a polymer type different from the fibers constituting the first base cloth, and can contain fibers having a melting point lower than the melting point of the fibers contained in the first base cloth by 30° C. or more.

The substantially strip-shaped member may be composed of the same material as the second base cloth or a different material, but is preferably composed of a ductile fabric material. The ductile fabric material used for the substantially strip-shaped member is preferably not compression molded and is preferably a felt-like material. Though the felt member used for the substantially strip-shaped member may be composed of the same material as the second base cloth, the contribution of the substantially strip-shaped member to the strength of the airbag cover of the present embodiment itself is small, and in order to more strongly integrate the first base cloth and the second base cloth, a material which is superior in thermocompression property to the fiber material used for the second base cloth can be used as the substantially strip-shaped member.

The airbag cover of the present embodiment is preferably provided separately from the airbag module, which consists of an inflator and a cushion. By providing the airbag cover separately from the airbag module, the airbag module can be enclosed by wrapping therearound the airbag cover after being produced. Thus, the airbag cover can be produced at a location separate from the airbag module.

An airbag device can be produced by enclosing a cushion containing an inflator with the airbag cover of the present embodiment. The airbag device may be a side airbag device which is provided on the side of the vehicle seat and which has a cushion which is inflated and deployed to the side of the occupant of the vehicle seat. In this case, the second base cloth of the airbag cover is provided so as to come into contact with the seat frame built into the vehicle seat along the side of the vehicle seat, and may be formed so as to function as a reaction force surface for receiving reaction force from the seat frame during inflation and deployment of the cushion. As a result, in a state in which the airbag module is enclosed with the airbag cover, the second base cloth can maintain the shape of the airbag module so as to avoid the edge of the seat frame and protect the airbag module.

Furthermore, the airbag device can be a curtain airbag device in which the cushion is inflated and deployed along the vehicle sidewall within the passenger compartment. In this case, the second base cloth of the airbag cover is preferably provided so as to contact the side wall of the vehicle body, and formed so as to function as a reaction force surface for receiving a reaction force from the side wall of the vehicle body during inflation and deployment of the cushion. As a result, in a state in which the airbag module is covered with the airbag cover, the second base cloth can protect the airbag module from, for example, the roof side rails of vehicle body side walls.

Prior to describing the method for producing the airbag cover of the present embodiment, first, as an example of a conventional production method, the structure and production method of the airbag cover disclosed in Patent Literature 2 will be described below. In Patent Literature 2, no members other than the first base cloth and the second base cloth are used in the bonding portion between the first base cloth and the second base cloth.

The initial tensile resistance value as used herein is defined as the tensile strength when a cloth having a predetermined shape is stretched by 5% under predetermined conditions of pulling the cloth using a predetermined tensile tester.

According to this production method, an airbag cover having a bonding portion in which the first base cloth and the second base cloth having different initial tensile resistance values are integrally bonded by thermocompression can be produced. As described above, by enclosing the rolled or folded cushion with the airbag cover formed by integrally bonding the first base cloth and the second base cloth, the cushion can be accommodated in a shape which fits in the predetermined location in the vehicle compartment.

Since the first base cloth has a lower initial tensile resistance value than the second base cloth and is softer, the cushion can be maintained in the desired accommodation state, and by providing slit regions (including those without openings), the bridge parts present between adjacent slit regions can reliably be broken without hindering inflation and deployment of the cushion, whereby the deployment behavior of the cushion can be stabilized. Conversely, since the second base cloth has a higher initial tensile resistance value than the first base cloth, by arranging it on the side closer to obstacles, the cushion can be protected thereby from obstacles not only when the cushion is accommodated but also during inflation and deployment, whereby problems such as bursting can be prevented.

The heat-welding described above is preferably performed at a temperature higher than the melting temperature of either the first base cloth or the second base cloth. As a result, the first base cloth or the second base cloth is melted, and by applying pressure in this state, the polymer penetrates into the interior of the melted base cloth, whereby the first base cloth and the second base cloth can be adhered.

Figure 3:
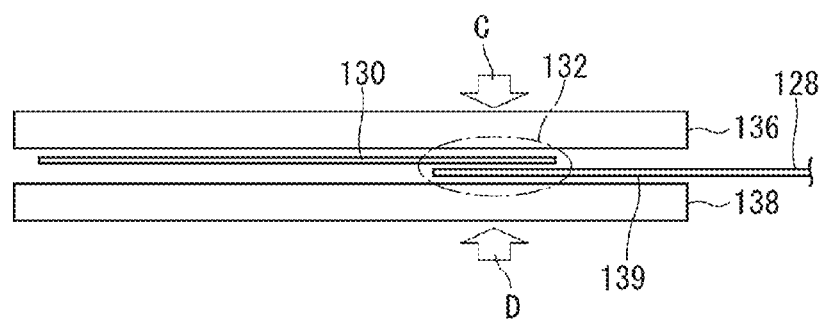
FIG. 3 is a view illustrating the airbag cover production method described in Patent Literature 2.
Figure 3:
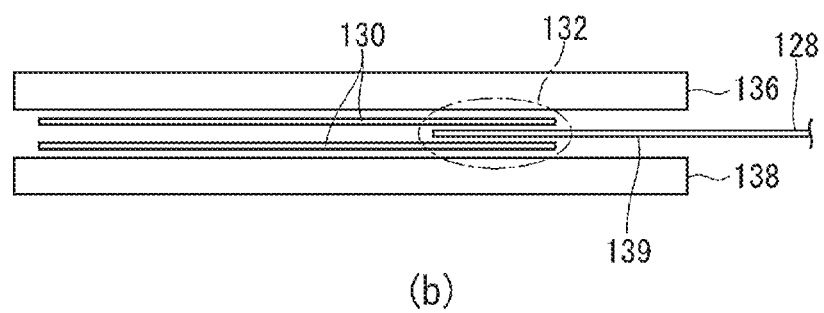

The method for preparing the bonding portion 132 of a conventional airbag cover will be specifically described with reference to FIG. 3.

It is preferable that the integration of the first base cloth and the second base cloth described above be performed by applying pressure during heat-welding (thermocompression). By overlaying the first base cloth and the second base cloth and pressing, the polymer can permeate into the interior of the base cloth, whereby the first base cloth and the second base cloth can be adhered together. This pressing is preferably performed simultaneously with heating (heat-welding), but may be performed after heating as long as the heated product retains residual heat.

A method of simultaneously molding a bonding portion 132 and a compressed body (second base cloth) 130 will be described with reference to FIG. 3. As shown in FIG. 3(*a*), for example, a first base cloth 128 composed of nylon N66 and a second base cloth 130 composed of a felt material prior to compression are partially overlapped, and pressure (for example, 5 kg/cm$^2$ to 50 kg/cm$^2$) is applied from the upward and downward directions indicated by arrows C and D by pressing with pressing devices 136, 138, and heat is also applied. The heating temperature may be, for example, 150° C. or 180° C., which is higher than the melting point (for example, 110° C.) of the second base cloth 130 (however, the heating temperature varies depending on the melting point of the second base cloth material, and may range from 100 to 200° C.; the heating temperature preferably ranges from 100 to 180° C., and more preferably 140° C. to 180° C.). Specifically, the pressing devices 136, 138 operate, for example, at a temperature higher than the melting point of the coating of the bicomponent composite fibers of the felt material but lower than the melting point of the core of the bicomponent composite fibers and the single component fibers. Note that it is not necessary to apply heat and pressure simultaneously. The heating temperature, pressure, and processing time are related to each other, and the processing conditions are not determined by only one parameter. The basic concept of the processing conditions is that the higher the heating temperature, the lower the pressure and the shorter the processing time. Overall, if any of these conditions is significant (high or long), the others may be relatively insignificant (low or short). Though FIG. 3(a) illustrates the formation of a bonding portion between the felt material prior to compression and the first base cloth, in place of the felt material prior to compression, the bonding portion between the compressed felt material and the first base cloth can be formed in the same manner.

When the felt material is heated and compressed, the fibers are compressed together, thinning the felt material (for example, 0.55 mm) and plastically deforming it into a compressed body. More specifically, heating above the melting point of the coating of the bicomponent composite fibers causes the coating to melt. Thus, the coatings fuse together at all locations where the fibers in the bond material are distributed. Since the bond material is heated at a lower temperature than the melting point of the core of the bicomponent composite fibers and the overall structure of the single-component fibers, the core and the single-component fibers remain in a solid state, do not fuse together, and only the materials of the coatings are fused. Note that FIG. 3(a) also shows a bridge part 139 (refer to FIG. 5(a)), which will be described later, of the first base cloth 128.

When heat and pressure are applied by the pressing devices 136, 138 in this manner and after a predetermined heating time (for example, 20 seconds or 100 seconds) has elapsed, the fluid polymer of the second base cloth 130 moves toward the voids of the first base cloth 128 and permeates the interior of the first base cloth 128. Thus, a bonding portion 132 which integrally bonds the first base cloth 128 and the second base cloth 130 is formed by heat-welding accompanied by pressure, and the entire second base cloth 130 is compressed and solidified to form a compressed body.

In the example of FIG. 3(a), when forming the bonding portion 132, the structure is such that the second base cloth 130, which is a felt material, is set on one side of the first base cloth 128, but the structure is not limited to this. For example, as shown in FIG. 3(b), in the case in which a plurality of laminated felt materials are used as the second base cloth, when forming the bonding portion 132, a structure in which the second base cloth 130 composed of a felt material is set so as to interpose the first base cloth 128 from above and below may be used. When a structure in which the second base cloth interposes the first base cloth from above and below is adopted in this manner, as compared to the example of FIG. 3(a), the first base cloth and the second base cloth can be integrated more reliably, but since it is necessary to interpose the first base cloth between the felt material constituting the second base cloth prior to compression, the operation becomes complicated, and such a method cannot be adopted when joining the second base cloth and the first base cloth after compression. Using either structure, the second base cloth 130 as a compressed body can be formed at the same time as the formation of the bonding portion 132.

By forming the bonding portion 132 by such pressure heat-welding, an airbag cover 114 (refer to FIG. 4) in which the first base cloth 128 and the second base cloth 130 having different initial tensile resistance values are integrally bonded can be produced.

Unlike the conventional airbag cover production method described above, the method for the production of an airbag cover of the present embodiment, which is another aspect of the present invention, comprises the steps of:

heat-compressing a ductile fabric material containing fibers different from fibers constituting a first base cloth composed of a plain fabric or non-woven fabric constituted by chemical fibers, and forming a second base cloth having an initial tensile resistance value higher than an initial tensile resistance value of the first base cloth as a compressed body; and heat-compressing the first base cloth interposed between a part of the obtained second base cloth and a substantially strip-shaped member, and integrally-bonding the second base cloth and the first base cloth by heat-welding.

Regarding this method, in FIG. 3(b), which illustrates the formation of a bonding portion between the felt material (two second base cloths) prior to compression and the first base cloth, one of the two second base cloths (felt material prior to compression) is replaced with a compressed felt material, and a substantially strip-shaped member is used in place of the other second base cloth.

The method for the production of an airbag cover according to the present embodiment will be described in detail below with reference to FIGS. 9 to 13.

Figure 9:
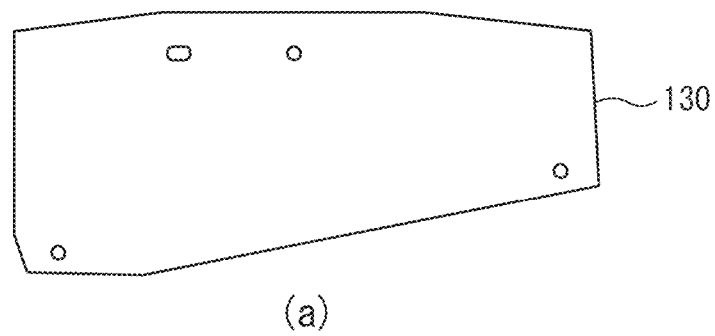
FIG. 9 is a plan view of examples of a second base cloth, a first base cloth, and a substantially strip-shaped member constituting the airbag cover of the present embodiment.
Figure 9:
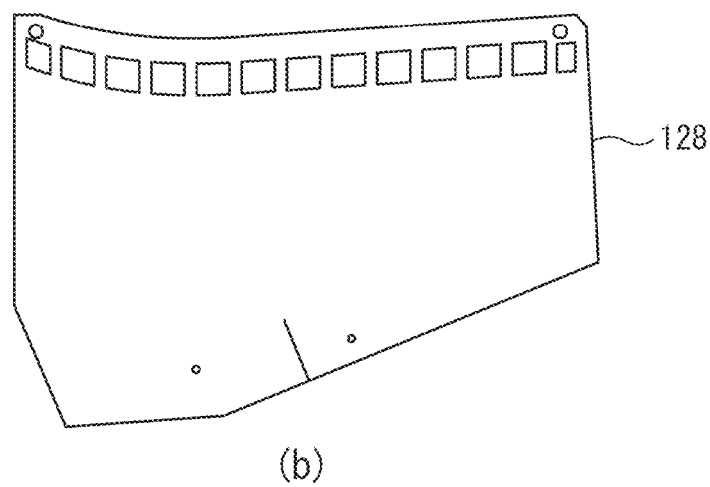
Figure 9:
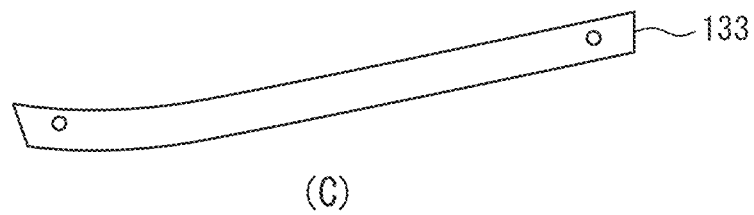

FIG. 9 illustrates a plan view of an example of a second base cloth (flat cloth prior to a heat treatment), a first base cloth, and a substantially strip-shaped member constituting the airbag cover of the present embodiment. Note that FIG. 9 is a plan view of the second base cloth (flat cloth prior to a heat treatment), first base cloth, and substantially strip-shaped member shown in FIG. 10 as viewed from the rear.

Figure 10:
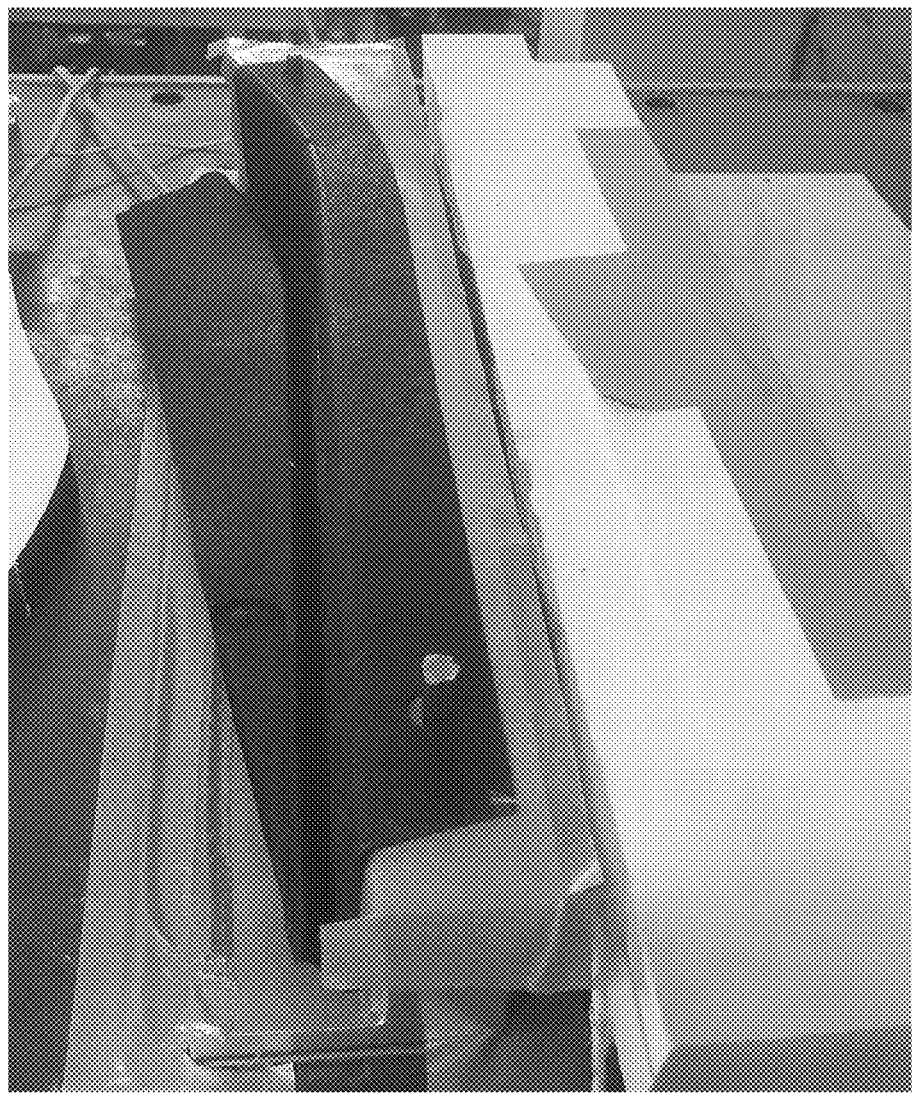
FIG. 10 is a photograph, in place of a drawing, showing a state in which a second base cloth (formed as a compressed body) having an initial tensile resistance value higher than an initial tensile resistance value of the first base cloth is set in a heat press device, wherein the second base cloth has been obtained by heat-compressing a ductile fabric material containing fibers different from fibers constituting a first base cloth composed of a plain fabric or non-woven fabric constituted by chemical fibers in a step of integrally bonding the second base cloth and the first base cloth by heat-compressing and heat-welding in the production method of the airbag cover of the present embodiment.

First, for example, the second base cloth (ductile fabric material containing fibers different from the fibers constituting the first base cloth constituted by a plain fabric or non-woven fabric composed of chemical fibers) having the shape prior to compression as shown in FIG. 9 is heat-compressed using a predetermined mold, to form a compressed body having an initial tensile resistance value higher than the initial tensile resistance value of the first base cloth (for example, the second base cloth having the shape shown in FIG. 10).

As shown in FIG. 10, the obtained second base cloth (formed as a compressed body) is set in a heat press device.

Next, as shown in FIG. 11, a first base material having a plurality of slit regions is set at a predetermined position on the second base cloth formed by compression.

Next, a substantially strip-shaped member is set at a predetermined position on the set first base cloth. At this time, it is preferable that it be set so that (1) the substantially strip-shaped member is arranged so as to cover the entire adhered portion of the first base cloth; (2) the substantially strip-shaped member is arranged so as to have a part directly contacting the second base cloth at the tip of the first base cloth; and (3) the substantially strip-shaped member is arranged in a part of the slit region of the first base cloth so as to have a part in direct contact with the second base cloth. By adopting this arrangement, the bonding portion in the obtained airbag cover has a structure with a higher bonding force. Furthermore, it is preferable that (4) beyond the edge of the first base cloth, only the second base cloth have a portion to be heat-pressed, substantially free of the strip-shaped member. By adopting this arrangement, a part where only the second base cloth is heat-pressed is continuously formed outside (the side away from the end of the first base cloth) of the part where the heat-pressed and substantially strip-shaped member and the second base cloth are integrated, whereby the bonding portion between the substantially strip-shaped member and the second base cloth can be strengthened.

Figure 13:
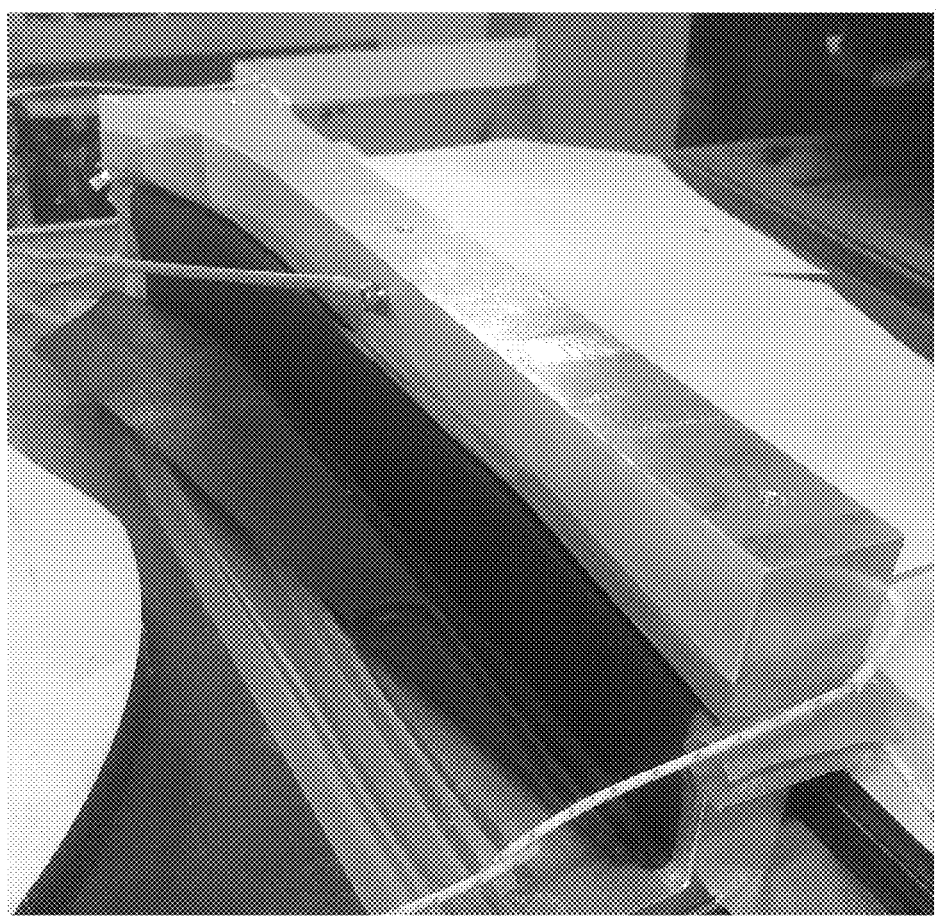
FIG. 13 is a photograph, in place of a drawing, showing a state in which a heat press device is set on a set substantially strip-shaped member.

Ultimately, as shown in FIG. 13, a heat press device is set on the set substantially strip-shaped member, and by heat-compressing, an airbag cover in which the first base cloth has a plurality of slit regions, and the second base cloth and the substantially strip-shaped member are directly bonded in the slit regions by thermocompression at the bonding portion can be produced. In the airbag cover obtained in this manner, between the second base cloth and the first base cloth, between the first base cloth and the substantially strip-shaped member, and/or between the second base cloth and the substantially strip-shaped member, a polymer of the fibers constituting one thereof permeates between the fibers constituting the other by heat-melting for bonding.

Figure 1:
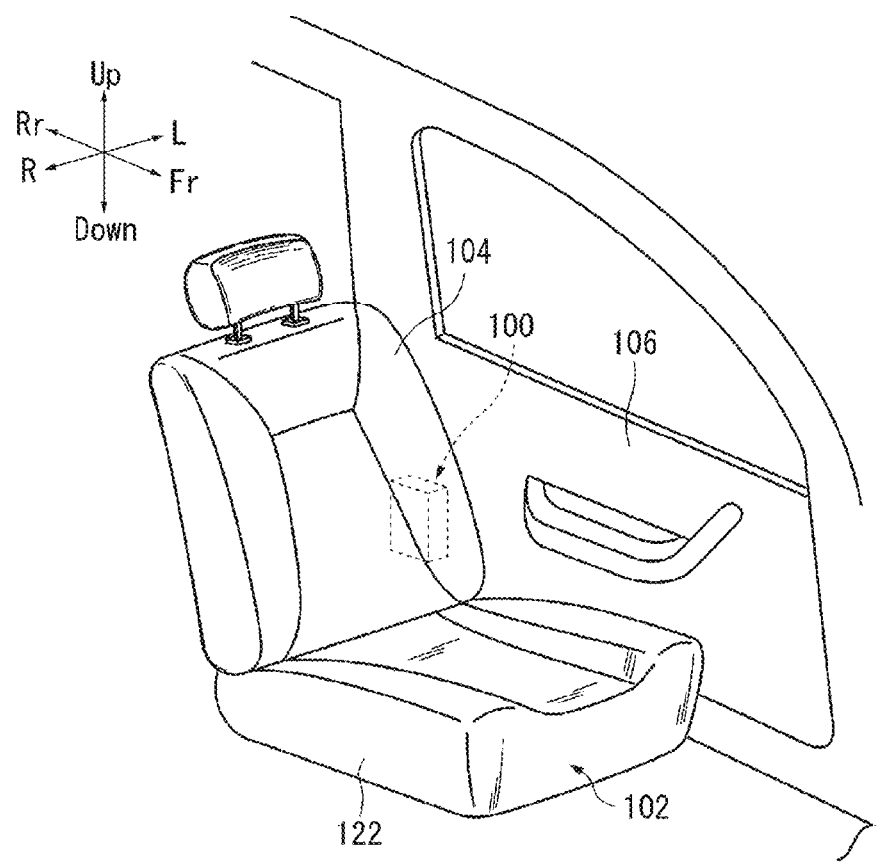
FIG. 1 is a view illustrating a side airbag device to which the airbag cover according to the present embodiment is applied and a part of a vehicle.
Figure 1:
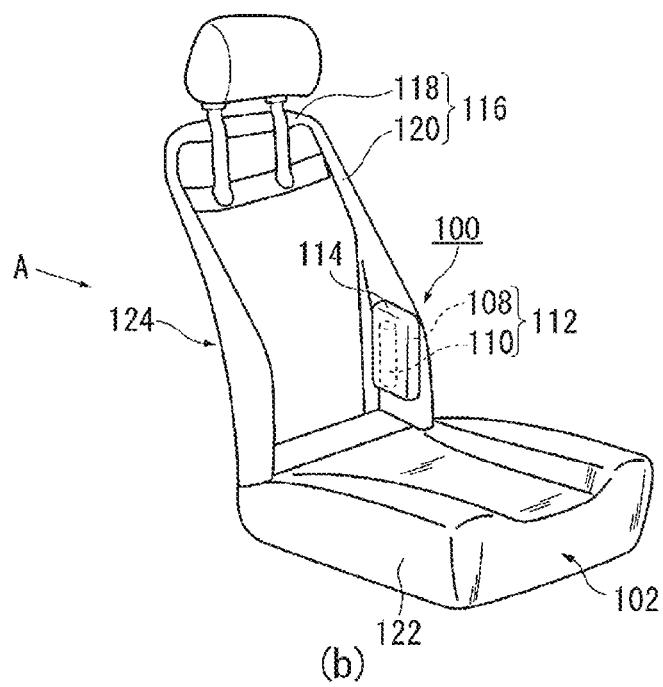

FIG. 1 is a view illustrating a side airbag device to which the airbag cover according to an embodiment of the invention is applied and a part of a vehicle. As shown in FIG. 1(a), the side airbag device 100 is incorporated in, for example, a seat back 104 of a vehicle seat 102 on the left side of the vehicle, which serves as a passenger seat in the vehicle.

The side airbag device 100 is provided toward the vehicle outer side of the seat back 104, and has a cushion 108 (refer to FIG. 2(b)) which stands between the vehicle seat 102 and the side door 106 for inflation and deployment. The side airbag device 100 also includes an inflator 110 which supplies gas for inflation and deployment to the cushion 108, as shown in FIG. 1(b).

The cushion 108 is formed into a bag shape using, for example, cutting and sewing. Furthermore, the cushion 108 is rolled or folded, and in an emergency, inflation and deployment are performed using gas supplied from an inflator 110, which is a built-in gas generator.

The side airbag device 100 further comprises an airbag cover 114 which encloses the airbag module 112, the details of which will be described later. Note that the airbag module 112 includes the cushion 108 and the inflator 110.

FIG. 1(b) illustrates only the seat back frame 116 of the seat back 104 of the vehicle seat 102 of FIG. 1(a), omitting the upholstery and seat pad (for example, urethane material). The seat back frame 116 is a frame member of the seat back 104 and includes an upper frame 118 and a side frame 120. The upper frame 118 is built into the seat back 104 along the top edge of the seat back 104. The side frame 120 is built into the seat back 104 along the side surface of the seat back 104. In addition to the seat back frame 116, a seat frame (not illustrated) built into the seat cushion 122 is also referred to as a seat frame 124.

As shown in FIG. 1(b), the side airbag device 100 is installed on the occupant side of the side frame 120 of the seat back frame 116 in a state in which the airbag module 112 including the cushion 108 and the inflator 110 is enclosed with the airbag cover 114.

Figure 2:
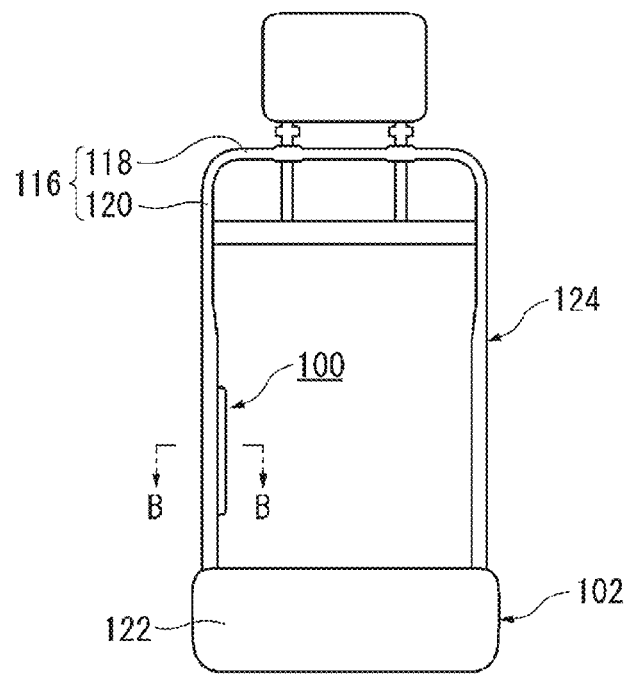
FIG. 2 is a view illustrating the side airbag device including an accommodated cushion of FIG. 1(b).
Figure 2:
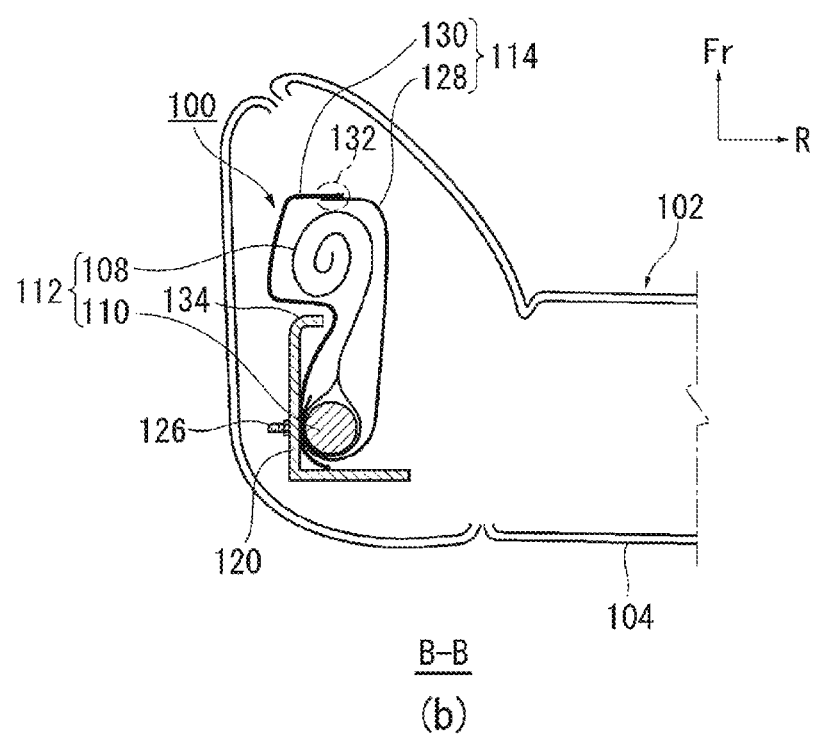

FIG. 2 is a view illustrating the side airbag device 100 including the cushion 108 in the accommodated state of FIG. 1(b). FIG. 2(a) is a view in the direction of arrow A of FIG. 1(b). FIG. 2(b) is a cross-sectional view taken along line B-B of FIG. 2(a).

The side airbag device 100 is installed on the occupant side of the side frame 120, as shown in FIG. 2(a). More specifically, in the airbag module 112, as shown in FIG. 2(b), the rolled or folded cushion 108 and the built-in inflator 110 are enclosed with the airbag cover 114 so as to achieve the accommodated state. In this state, the airbag module 112 is installed on the side frame 120 via the inflator 110 and accommodated on the passenger side of the side frame 120. The inflator 110 is a of cylinder type (cylindrical), and is attached to the occupant side of the side frame 120 with a stud bolt 126 protruding from the body.

The airbag cover 114 comprises the first base cloth 128 and the second base cloth 130 having different initial tensile resistance values (which will be described later), and the first base cloth 128 and the second base cloth 130 are integrally bonded via the bonding portion 132 formed by heat-welding.

The initial tensile resistance value (N) as used herein is defined as the tensile strength (N) when a cloth having a predetermined shape is stretched by 5% under predetermined conditions of pulling the cloth using a predetermined tensile tester.

An example of the method for measuring the initial tensile resistance value will be described below.

An AUTOGRAPH AG-50kNG manufactured by SHIMADZU (tensile tester) was used as the tensile strength measuring device. A SIMADZU (Kyowa load cell) Type SFL-50KNAG (P/N 340-43122-01) 50KN was used as the load cell. An extensometer SES-1000 manufactured by SHIMADZU was used to measure the tensile length.

The shape of the fabric test piece (sample piece) to be produced was 50 mm×300 mm. As the cloth, an N66 plain weave base cloth and PET non-woven fabric were prepared. The N66 plain weave base cloth was cut to 60 mm×300 mm, and the warp was removed to make it exactly 50 mm×300 mm. The PET non-woven fabric was cut to 50 mm×300 mm. The test was performed by pulling the N66 plain weave base cloth in the warp direction and the PET non-woven fabric in the MD (Machine Direction) direction. The number of samples was n=5.

The specific test conditions will be described below.

Under an environment of ambient temperature (20° C.±15° C.), ambient humidity (45 to 85% relative humidity), and ambient pressure (pressure when neither pressure reduction nor pressure is applied, generally equal to atmospheric pressure, approximately one atmosphere), first, an air chuck was used to grip the sample, and the chuck width (initial length) was 100 mm and the initial load was 1.5 N. Next, the clamps of the extensometer were gripped and placed near the center of the sample piece so that the interval between them was 50 mm. The sample piece was then pulled at a tensile speed of 100 mm/min, and the tensile strength value when the initial length was elongated by 5% was taken as the initial tensile resistance value (N).

The first base cloth 128 is a base cloth constituted by a plain fabric or a non-woven fabric composed of chemical fibers, and is formed, for example, by interweaving warp and weft of nylon fibers or polyester fibers. The first base cloth 128 can be formed by weaving such fibers together. However, without being limited thereto, a non-woven fabric of nylon, polyester, or polypropylene may be used as the first base cloth 128.

The second base cloth 130 is a base cloth which contains fibers different from those of the first base cloth 128 and has an initial tensile resistance value which is higher than the initial tensile resistance value of the first base cloth 128, and it can be composed of a ductile fabric material. The ductile fabric material may be a non-woven fabric material comprising a plurality of polymeric fibers, a felt-like material, or may be formed of polyester fibers. By forming the second base cloth 130 as a compressed body from such a ductile fabric material, the initial tensile resistance value can be made higher than that of the first base cloth 128.

Since the first base cloth 128 and the second base cloth 130 can maintain their own shapes due to their properties, by enclosing the rolled or folded cushion 108, the cushion 108 can be accommodated in a shape which fits in a predetermined location in the vehicle interior, such as the passenger side of the side frame 120. Furthermore, since the first base cloth 128 has a lower initial tensile resistance value than the second base cloth 130 and is softer, the cushion 108 can be easily deformed to follow the shape of the predetermined location where the cushion 108 is to be accommodated. Specifically, the first base cloth 128 excels in the function of maintaining the cushion 108 in a desired accommodation state. By providing a slit region in the soft first base cloth 128, the bridge part between the slit regions can reliably be broken without hindering the inflation and deployment of the cushion 108, and as a result, the deployment behavior of the cushion 108 can be stabilized.

Conversely, since the second base cloth 130 has a relatively higher initial tensile resistance value than the initial tensile resistance value of the first base cloth 128, it is not only less likely to deform, but also can maintain its shape. Thus, the second base cloth 130 is provided so as to come into contact with the side frame 120 from the passenger side, as shown in FIG. 2(b). Specifically, by arranging the second base cloth 130 of the cushion 108 in the accommodated state on the side closer to obstacles such as the edge 134 of the side frame 120, the shape of the cushion 108 can be maintained so as to avoid the obstacles. Thus, the second base cloth 130 can protect the cushion 108 from obstacles and prevent problems such as bursting not only when the cushion 108 is accommodated, but also during inflation and deployment, and in particular, when the second base cloth 130 is composed of, for example, a felt material instead of plastic, it is softer than plastic, whereby it can be deformed in accordance with the shape of the predetermined location where the cushion 108 is to be accommodated, and further weight reduction can be achieved.

The material of the bonding portion 132 shown in FIG. 2(b) will be described. The bonding portion 132 is molded from a ductile fabric material comprising a plurality of polymeric fibers derived from a second base cloth and the substantially strip-shaped member, at least some of the polymer fibers are formed together by fusion, and as an example, it can take the form of a non-woven fabric material comprising a plurality of polymer fibers. A felt-like material (for example, a polyester felt) can be used as the non-woven fabric. Polyester felt is produced by the known needle method in which polyester fibers are entangled and secured together by needle processing. As another example, polyester fibers can be provided as polyethylene terephthalate (PET) and the felt material can be formed from 100% PET. The second base cloth and the substantially strip-shaped member may be made of the same felt material or different felt materials having different properties. Since the substantially strip-shaped base cloth contributes less to the strength of the bond structure of the first base cloth and the second base cloth in the airbag cover of present embodiment as compared to the second base cloth, by emphasizing the heat workability of the base cloth, the felt can be formed from fibers which are easier to heat mold than the second base cloth.

The fibers constituting the felt material intertwine with each other in a random or pseudo-random manner. The felt material can contain fibers having two different configurations. Although the single-component fibers constituting the felt material can all be formed of a PET homopolymer, bi-component composite fibers having a core and a surrounding coating can be used. The core and coating of the bicomponent composite fibers are configured to have different properties, in particular different melting points, with the coating having a significantly lower melting point than the core (for example, the melting point of the core material is approximately 260° C., and the melting point of the coating is approximately 110° C. to 150° C.). As an example, the second base cloth 130 more preferably contains fibers having a melting point that is lower than the melting point of the fibers contained in the first base cloth by 30° C. or more.

The bicomponent composite fibers can also all be composed of polyester, the core can be molded from a PET homopolymer, and the coating can be composed of a copolymer (coPET). Such a combination of PET and coPET ensures that the fibers are entirely made of PET and the melting point of the coating is lower than that of the core.

Since the core of the bicomponent composite fibers and the single-component fibers are both composed of a PET homopolymer, they have the same melting point as each other, and the single-component fibers have a higher melting point than the coating of the bicomponent composite fibers. The bicomponent composite fibers are evenly distributed throughout the single-component fibers in the felt material. The bicomponent composite fibers may account for 30% to 60% of the total fibers in the felt material, with the remainder being all single-component fibers. By including bicomponent composite fibers in the felt material of the second base cloth 130, the initial tensile resistance value of the second base cloth 130 can also be increased by heat-processing (heat-treating) the felt material at a temperature above the melting point of the coating.

In Examples 1 to 3 below, the stability of the shape of the airbag during deployment was verified using an airbag cover obtained by combining a first base cloth and a second base cloth.

In Example 1, an N66 plain weave base cloth was prepared as the first base cloth, and a heated PET+Co-PET non-woven fabric was prepared as the second base cloth, and these were combined. The N66 plain weave base cloth was formed by plain weaving nylon 66 fibers. In the PET+Co-PET non-woven fabric, conventional PET was used in the core of the fibers and Co-PET (Copolymer-PET: modified PET copolymer) was used in the coating (sheath), and a fabric was formed by appropriately bonding by chemical bonding, thermal bonding, needle punching, spunlacing, or stitch bonding. The heat treatment of the second base cloth was a treatment to obtain a compressed body by heating and pressurizing under conditions of 150° C. to 200° C. for 20 seconds to 3 minutes to harden the non-woven fabric. In Example 1, the initial tensile resistance value of the first base cloth was "125 N", the initial tensile resistance value of the second base cloth was "425 N", and this initial tensile resistance value was higher than that of the first base cloth. As a result, in Example 1, the stability of the shape when the airbag was deployed was "excellent", i.e., the shape retention when the airbag module was installed was suitable, and the deployment behavior during deployment was stable and suitable.

In Example 1, when combining the first base cloth and the second base cloth, in the case in which there is adopted a method of joining the first base cloth and the second base cloth using a substantially strip-shaped member having the same composition as the second base cloth and which (1) has a size covering the entire adhered part of the first base cloth, (2) having a portion directly contacting the second base cloth at the tip of the first base cloth, (3) a part of the slit region of the first base cloth that has a part in direct contact with the second base cloth, and (4) there is no strip-shaped member beyond the edge of the first base cloth and has only a portion to be heat-pressed with the second base cloth, a clear improvement in productivity was observed as compared to the method shown in FIG. 3(b), in which the first base cloth is interposed between two second base cloths and joined.

In Example 2, a PET non-woven fabric was prepared as the first base cloth and a heat-treated PET+Co-PET non-woven fabric was prepared as the second base cloth, and these were combined. The PET non-woven fabric was constituted by polyester (polyethylene terephthalate) fibers formed into a non-woven fabric by a spunbond method. In Example 2, the initial tensile resistance value of the first base cloth was "143 N", the initial tensile resistance value of the second base cloth was "425 N", and this initial tensile resistance value was higher than that of the first base cloth. As a result, in Example 2, the stability of the shape when the airbag was deployed was "excellent", i.e., the shape retention when the airbag module was installed was suitable, and the deployment behavior when deployed was stable and suitable.

In Example 3, a PET non-woven fabric was prepared as the first base cloth and a PET+Co-PET non-woven fabric was prepared as the second base cloth, and these were combined. The second base cloth of Example 3 is outside the scope of the present embodiment in that it is not heat-treated and is not a compressed body. In Example 3, the initial tensile resistance value of the first base cloth was "143 N", the initial tensile resistance value of the second base cloth, which was not heat-treated, was "50 N", and this initial tensile resistance value was lower than that of the first base cloth. As a result, in Example 3, the stability of the shape when the airbag was deployed was "poor", i.e., the shape retention when the airbag module was installed was poor, and the deployment behavior at the time of deployment was not stable.

Figure 4:
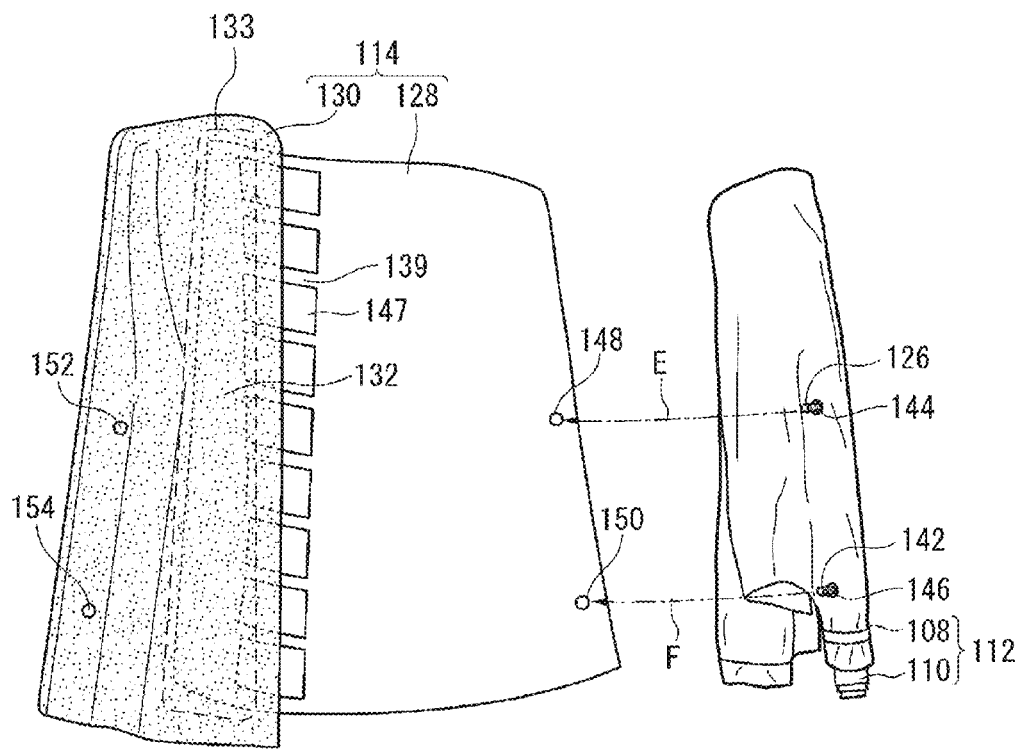
FIG. 4 is a view illustrating a step of wrapping an airbag cover around an airbag module.
Figure 4:
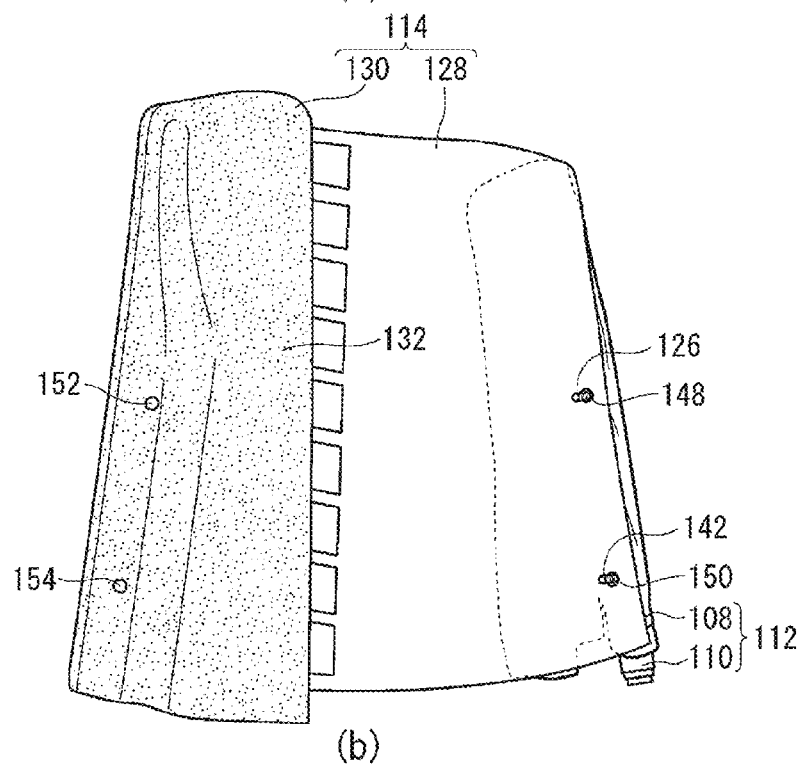

The procedure for wrapping the airbag cover 114 around the airbag module 112 to enclose it will be described below with reference to FIGS. 4 to 6. FIG. 4 is a view illustrating the step of wrapping the airbag cover 114 around the airbag module 112.

As shown in FIG. 4(a), in the airbag module 112, in a state in which the stud bolts 126, 142 protruding from the body of the inflator 110 are inserted into the cushion 108, the stud bolts 126, 142 are inserted into two respective insertion holes 144, 146 formed in the cushion 108 and passed from the inside of the cushion 108 toward the outside.

The airbag cover 114 is composed of a first base cloth 128 and a second base cloth 130, which is a compressed body. A plurality of slit regions 147 (with openings) are formed from the bonding portion 132 of the first base cloth 128 and the second base cloth 130 to the first base cloth 128. A bridge part 139 is formed between the slit regions 147. The slit regions 147 (with openings) of the first base cloth and part of the bridge part 139 are formed within the area of the second base cloth 130 as a compressed body. In this region, the first base cloth 128 is substantially interposed between the strip-shaped member 133 and the second base cloth to form the bonding portion 132. Conversely, the slit regions 147 (with openings) and the remainder of the bridge part 139 are formed in a region of the first base cloth 128 only.

The cushion 108 is rolled or folded. As shown in FIG. 4(a), in the airbag cover 114, insertion holes 148, 150 for the stud bolts 126, 142 are formed in the first base cloth 128, and likewise, insertion holes 152, 154 for stud bolts 126, 142 are formed in the second base cloth 130, which is a compressed body.

First, as shown in FIG. 4(a), the airbag module 112 is arranged near the side of the airbag cover 114. Next, the stud bolts 126, 142 of the inflator 110 are passed through the insertion holes 148, 150 of the first base cloth 128 from the back side of the first base cloth 128 (arrows E, F), thereby overlapping the airbag module 112 on the first base cloth 128 (refer to FIG. 4(b)).

Figure 5:
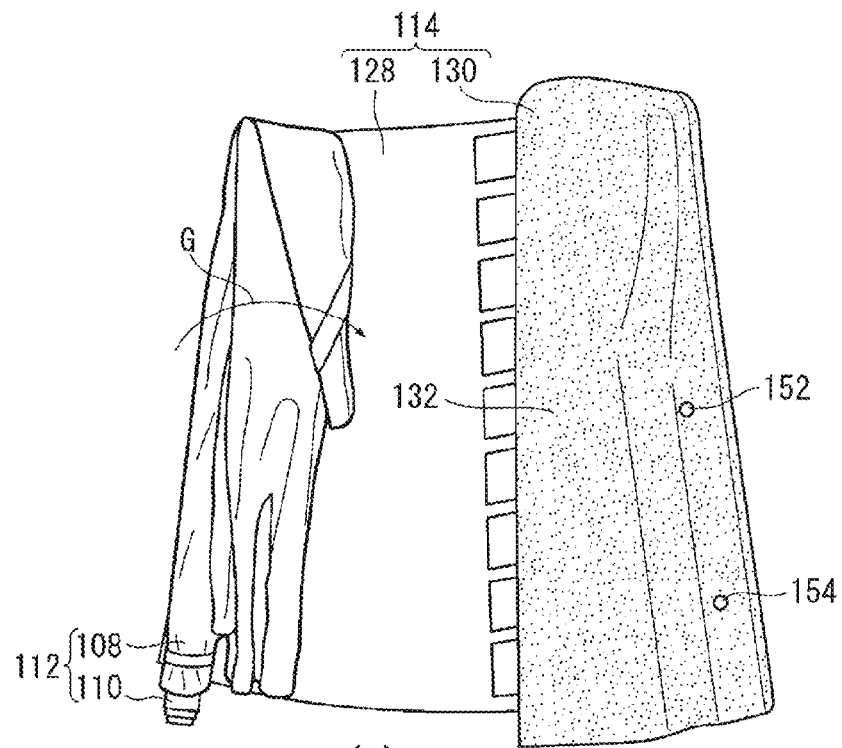
FIG. 5 is a view illustrating the step following FIG. 4.
Figure 5:
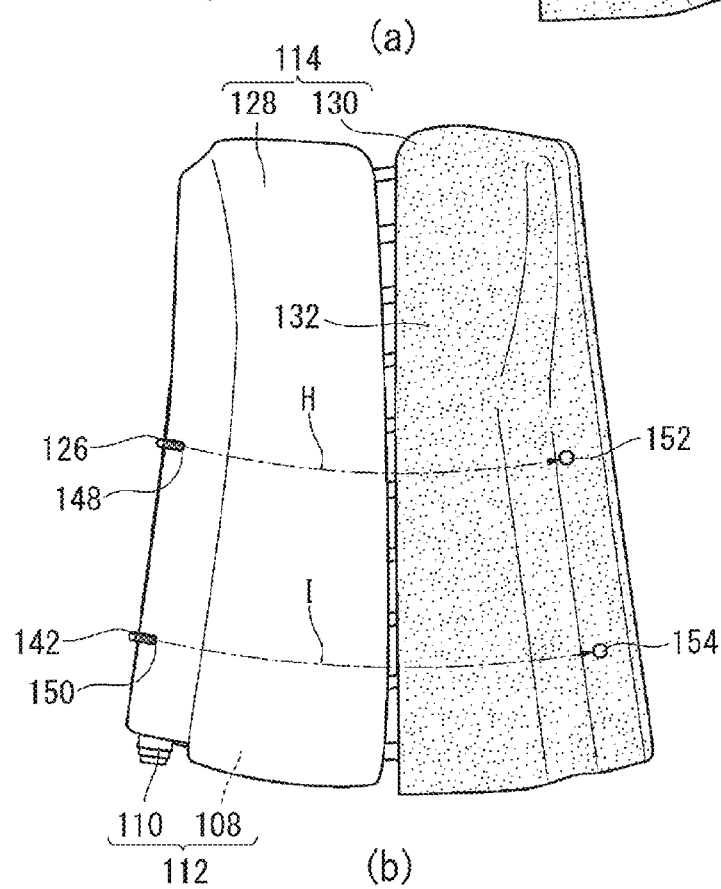

FIG. 5 is a view illustrating the steps following FIG. 4. FIG. 5(a) shows a state in which the airbag cover 114 and the airbag module 112 shown in FIG. 4(b) are viewed from behind. From this state, when the airbag module 112 is rolled together with the first base cloth 128 toward the second base cloth 130 (arrow G), the airbag module 112 enclosed with the first base cloth 128 approaches the second base cloth 130 as shown in FIG. 5(b). Further, from this state, as indicated by arrows H and I in FIG. 5(b), the airbag module 112 enclosed with the first base cloth 128 is wrapped toward the second base cloth 130 so that the stud bolts 126, 142 passed through the through holes 148, 150 of the first base cloth 128 are passed through the insertion holes 152, 154 of the second base cloth 130, respectively. A side airbag device 100 in which the airbag module 112 is enclosed with the airbag cover 114 can be produced in this manner (refer to FIG. 6).

Figure 6:
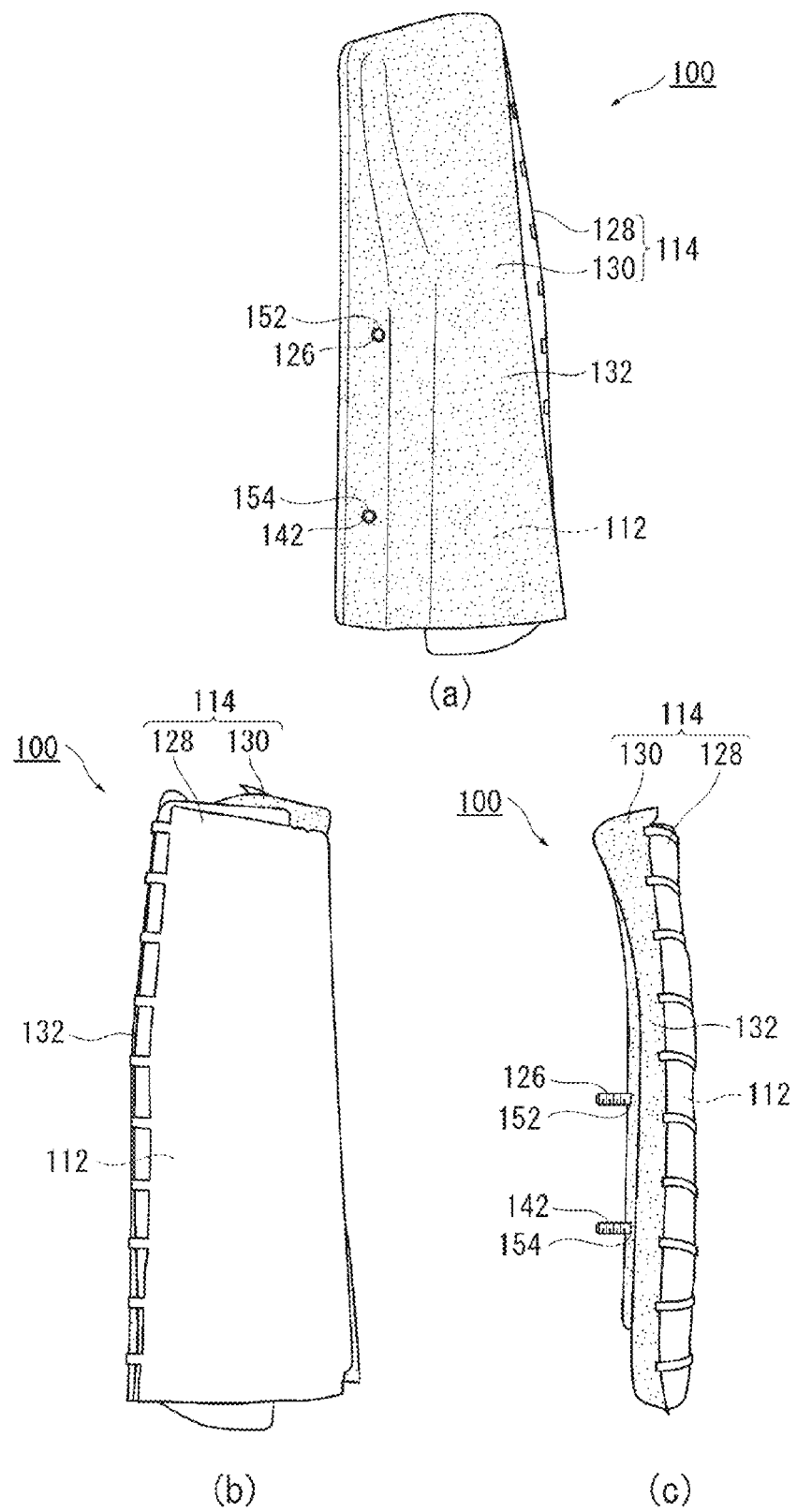
FIG. 6 is a view illustrating a side airbag device produced by the steps shown in FIGS. 4 and 5.

FIG. 6 is a view illustrating the side airbag device 100 produced via the steps shown in FIGS. 4 and 5. In the side airbag device 100, the stud bolts 126, 142 are passed through the insertion holes 152, 154 of the second base cloth 130 as shown in FIGS. 6(a) and 6(c), respectively, and the airbag module 112 is enclosed with the airbag cover 114 as shown in FIG. 6(c).

By providing the airbag cover 114 separately from the airbag module 112 in this manner, the airbag module 112 can be enclosed by wrapping therearound the airbag cover 114 after being produced. Thus, the airbag cover 114 can be made at a location separate from the airbag module 112.

In the side airbag device 100 configured in this manner, when the cushion 108 of the airbag module 112 inflates and deploys, the first bridge part 139 of the slit regions 147 (with openings) of the first base cloth 128 (FIG. 4(a)) can break easily, which does not hinder inflation and deployment of the cushion 108.

Figure 7:
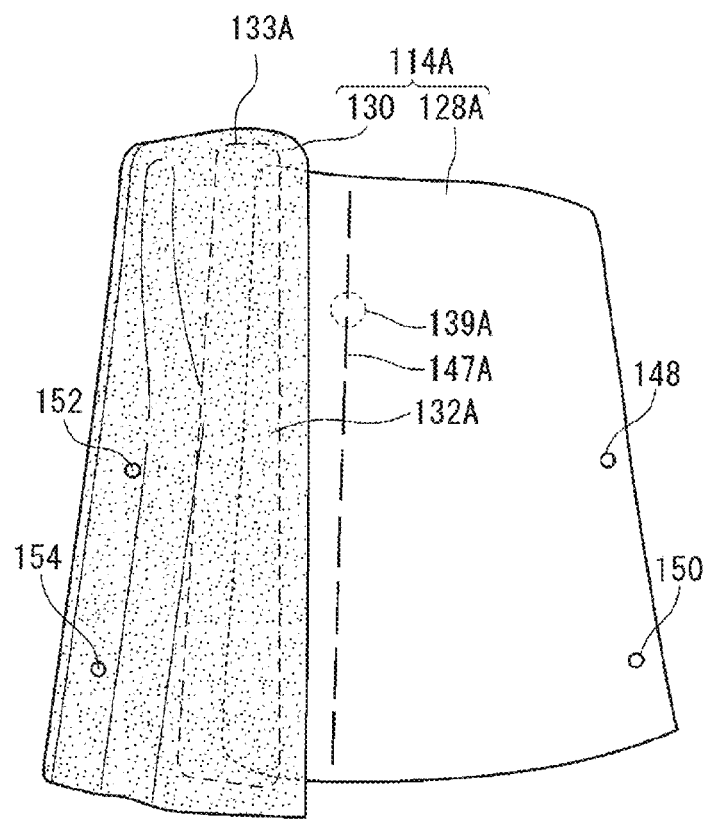
FIG. 7 is a view illustrating a modification of the airbag cover of FIG. 5(a).

FIG. 7 is a view illustrating a modification of the airbag cover 114 of FIG. 4(a). The airbag cover 114A shown in FIG. 7(a) has a configuration in which the slit regions 147A (no openings) of the first base cloth 128A do not overlap the bonding portion 132A. In the bonding portion 132A of the airbag cover 114A, the overlapping portion of the first base cloth 128A and the second base cloth 130 and the substantially strip-shaped member 133A are in contact with each other over the entire surface and are bonded. The slit regions 147A (without openings) and the bridge part 139A of the first base cloth 128A are alternatingly provided along the edge of the second base cloth 130, which is the compressed body, within the region of the first base cloth 128A. In the side airbag device 100 using such an airbag cover 114A, during inflation and deployment of the cushion 108, the bridge part 139A between the slit regions 147A (without openings) of the first base cloth 128A can easily break, which does not hinder inflation and deployment of the cushion 108.

Figure 8:
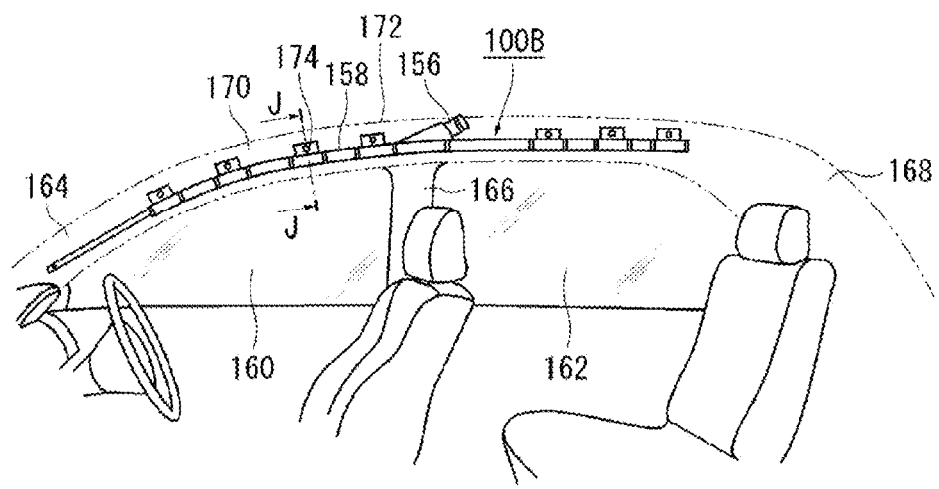
FIG. 8 is a view illustrating a curtain airbag device to which the airbag cover of the present embodiment is applied.
Figure 8:
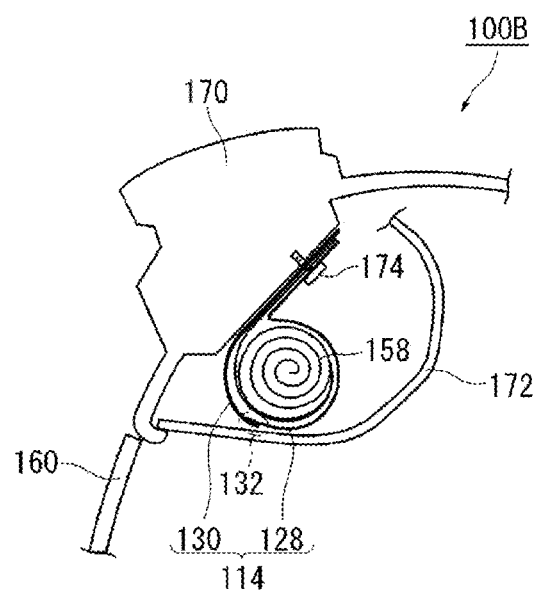

FIG. 8 is a view illustrating a curtain airbag device 100B to which the airbag cover 114 according to an embodiment of the invention is applied. FIG. 8(a) shows a state when the curtain airbag device 100B is not deployed (when accommodated). FIG. 8(*b*) illustrates the cross-section J-J of FIG. 8(*a*).

In the curtain airbag device 100B, the cushion 158 is inflated and deployed by the pressure of gas supplied from the inflator 156 in an emergency such as a side collision to restrain the occupant. As shown in FIG. 8(*a*), side windows 160, 162 are installed on the sides of the vehicle from the front of the vehicle. A pillar supporting the roof (ceiling) is provided in each of the side windows 160, 162 in the longitudinal direction of the vehicle. These pillars, from the front of the vehicle, are referred to as the front pillar 164, center pillar 166, and rear pillar 168.

The vehicle further has a roof side rail 170 and a cover 172 which covers the roof side rail 170 from the inside of the vehicle. In FIG. 8(*a*), the cover 172 is represented by the dot-and-dash line. The roof side rails 170 are located on the upper sides of the vehicle interior and form the side walls of the vehicle.

The cushion 158 is rolled or folded over the entire longitudinal direction of the vehicle, and is accommodated between the roof side rail 170 and the cover 172 in the cross-section J-J shown in FIG. 8(*b*). The cushion 158 accommodated in these limited accommodation spaces is attached to the upper side of the passenger compartment by a plurality of tabs 174.

In the curtain airbag device 100B, as shown in FIG. 8(*b*), the cushion 158 is covered by the airbag cover 114 and is in an accommodated state, and the second base cloth 130 is provided so as to contact the roof side rail 170, which is the side wall of the vehicle body, and is formed to function as a reaction force surface for receiving the reaction force from the roof side rail 170 during inflation and deployment of the cushion 158.

Thus, according to the curtain airbag device 100B, by arranging the second base cloth 130, which has a relatively high initial tensile resistance value and is unlikely to deform at the cushion 158 in the accommodated state on the side closer to obstacles (here, the roof side rail 170), the cushion 158 can be protected from obstacles and problems such as bursting can be prevented. Furthermore, since the first base cloth 128 has a lower initial tensile resistance value than the second base cloth 130 and is softer, the cushion 158 can easily deform to follow the shape of the predetermined location where the cushion 158 is to be accommodated, and the cushion 158 can be accommodated in a shape which fits the predetermined location.

Thus, the airbag cover 114 can be applied to both the side airbag device 100 and the curtain airbag device 100B, and the rolled or folded cushions 108, 158 can be accommodated in a shape which fits in the predetermined location in the vehicle interior, and the cushions 108, 158 can be protected from obstacles.

Though the embodiments of the present invention have been described in detail with reference to the attached drawings, the present invention is not limited to these embodiments. It is clear that a person skilled in the art could conceive of various changes or modifications within the scope described in the claims, and it is understood that these are also encompassed in the technical scope of the present invention.

Though examples in which a side airbag device and curtain airbag device comprising an airbag cover is applied to an automobile have been described, it can also be applied to aircraft, ships, etc., in addition to automobiles, and similar effects can be obtained.

INDUSTRIAL APPLICABILITY

The present invention can suitably be used as an airbag cover for enclosing a cushion which is accommodated in a vehicle interior and which is inflated and deployed for the purpose of protecting occupants in an emergency, as well as a method for the production thereof and an airbag device comprising the airbag cover.

DESCRIPTION OF REFERENCE SIGNS

100 side airbag device
100B curtain airbag device
102 vehicle seat
104 seat back
106 side door
108, 158 cushion
110, 156 inflator
112 airbag module
114, 114A airbag cover
116 seat back frame
118 upper frame
120 side frame
122 seat cushion 124 seat frame
126, 142 stud bolt
128, 128A first base cloth
130 second base cloth
132, 132A bonding portion
133 substantially strip-shaped member
133A substantially strip-shaped member
134 side frame edge
136, 138 heat press device
139, 139A first base cloth bridge part
144, 146 cushion through hole
147 first base cloth slit region (with opening)
147A first base cloth slit region (linear, no opening)
148, 150 first base cloth through hole
152, 154 second base cloth through hole
160, 162 side window
164 front pillar
166 center pillar
168 rear pillars
170 roof side rail
172 cover
174 tab

The invention claimed is:

1. An airbag cover for accommodating a rolled or folded bag-like cushion prior to inflation and deployment by a gas supplied from an inflator, wherein the airbag cover is constituted by a first base cloth composed of a plain fabric or non-woven fabric constituted from chemical fibers, and a second base cloth comprising fibers different from fibers constituting the first base cloth and having an initial tensile resistance value which is higher than an initial tensile resistance value of the first base cloth, and has a bonding portion where the first base cloth is interposed between the second base cloth and a substantially strip-shaped member and integrally bonded by thermocompression.

2. The airbag cover according to claim 1, wherein the first base cloth has a plurality of slit regions, and at the bonding portion, the second base cloth and the substantially strip-shaped member are directly bonded by thermocompression at the slit regions.

3. The airbag cover according to claim 1, wherein between the second base cloth and the first base cloth, between the first base cloth and the substantially strip-shaped member, and/or between the second base cloth and the substantially strip-shaped member, a polymer of the fibers constituting one thereof permeates between the fibers constituting the other by heat-melting for bonding.

4. The airbag cover according to claim 1, wherein the chemical fibers constituting the first base cloth are at least one selected from the group consisting of rayon, nylon, polyester, polypropylene, acrylic, vinylon, and aramid.

5. The airbag cover according to claim 1, wherein the second base cloth is constituted by a compressed body formed of a compressed ductile fabric material.

6. The airbag cover according to claim 5, wherein the ductile fabric material is a felt-like material.

7. The airbag cover according to claim 5, wherein the ductile fabric material is a non-woven fabric material comprising a plurality of types of polymer fibers.

8. The airbag cover according to claim 5, wherein the ductile fabric material comprises polyester fibers.

9. The airbag cover according to claim 1, wherein the second base cloth comprises fibers having a melting point lower than the melting point of the fibers contained in the first base cloth by 30° C. or more.

10. The airbag cover according to claim 1, wherein the substantially strip-shaped member is formed from a ductile fabric material.

11. An airbag device comprising a cushion enclosed with the airbag cover according to claim 1.

12. The airbag device according to claim 11, wherein the airbag device is a side airbag device provided on the side of a vehicle seat and the cushion is inflated and deployed on a side of an occupant of the vehicle seat.

13. The airbag device according to claim 12, wherein the second base cloth of the airbag cover is provided so as to come into contact with a seat frame incorporated in the vehicle seat along a side of the vehicle seat, and is formed to function as a reaction force surface for receiving a reaction force from the seat frame during inflation and deployment of the cushion.

14. The airbag device according to claim 11, which is a curtain airbag device in which the cushion is inflated and deployed along a side wall of a vehicle inside the vehicle.

15. The airbag device according to claim 14, wherein the second base cloth of the airbag cover is provided so as to come into contact with the side wall of a vehicle body, and is formed to function as a reaction force surface for receiving a reaction force from the side wall of the vehicle body during inflation and deployment of the cushion.

16. A method for the production of the airbag device according to claim 1, comprising the following steps of:
heat-compressing a ductile fabric material containing fibers different from fibers constituting a first base cloth composed of a plain fabric or non-woven fabric constituted by chemical fibers, and forming a second base cloth having an initial tensile resistance value higher than an initial tensile resistance value of the first base cloth as a compressed body; and
heat-compressing the first base cloth interposed between a part of the obtained second base cloth and a substantially strip-shaped member, and integrally-bonding the second base cloth and the first base cloth by heat-welding.

* * * * *